United States Patent Office 3,100,739
Patented Aug. 13, 1963

3,100,739
PROCESS FOR DYEING HUMAN HAIR WITH WATER SOLUBLE, QUATERNARY AMMONIUM CONTAINING DYES
Wilhelm Jakob Kaiser and Peter Berth, Dusseldorf-Holthausen, Germany, assignors to Therachemie chemisch therapeutische Gesellschaft m.b.H., Dusseldorf, Germany
No Drawing. Filed Feb. 18, 1959, Ser. No. 793,986
Claims priority, application Germany Feb. 25, 1958
1 Claim. (Cl. 167—88)

The invention relates to agents for dyeing of human hair which exhibit excellent water-solubility as well as good applicability without coloring the skin to any appreciable extent. The agents are especially represented by a content of coloring matter which contains quaternary ammonium groups.

Many dyes are known which are suitable for use of human hair. These agents, however, frequently have the disadvantage that they are soluble in water only with difficulty so that the concentrations required for the required depth of color cannot easily be obtained.

Other dyes which are sufficiently water-soluble usually do not have the desirable ease of application. Moreover, dyes used heretofore, e.g., 2-nitrophenylene diamine-1,4 often adversely affect the skin. The compounds initially mentioned and employable according to the present invention are numerous and may be long in different classes. One of these classes is the one known as "azo dyes," i.e., compounds which contain either of the groups represented in Formula 1 or 2.

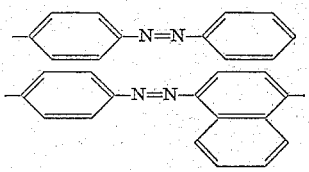

The quaternary nitrogen atom, in these configurations can be bound directly to a carbon atom in the ring. It has been found, however, that such compounds are suitable for the purpose in which the quaternary group is bound to the aromatic radical by way of a carbon chain which may be interrupted by heteroatoms, such as oxygen, sulfur and particularly nitrogen. Compounds containing a plurality of quaternary groups also can be used.

The azo compounds employed in the agents according to the present invention can be prepared either by azotization of primary aromatic amines, attachment to aromatic amines followed by quaternation, or else by diazotization of quaternary ammonium salts containing a primary aromatic amino group and attachment to an aromatic amine.

It has been found opportune to employ azo compounds which are free of acidic groups whereas basic groups may be present. By acidic groups we mean sulfo- and carboxyl groups and also OH groups if the latter are of a phenolic character. Basic groups are especially amino groups. The hydrogen atoms therein may be substituted by short alkyl radicals.

Without intention of restricting the present invention, Formulas 3 to 18 are given as examples for a number of azo dyes which have proven especially suitable for the hair dyeing purpose according to the present invention.

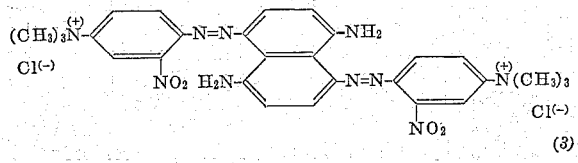

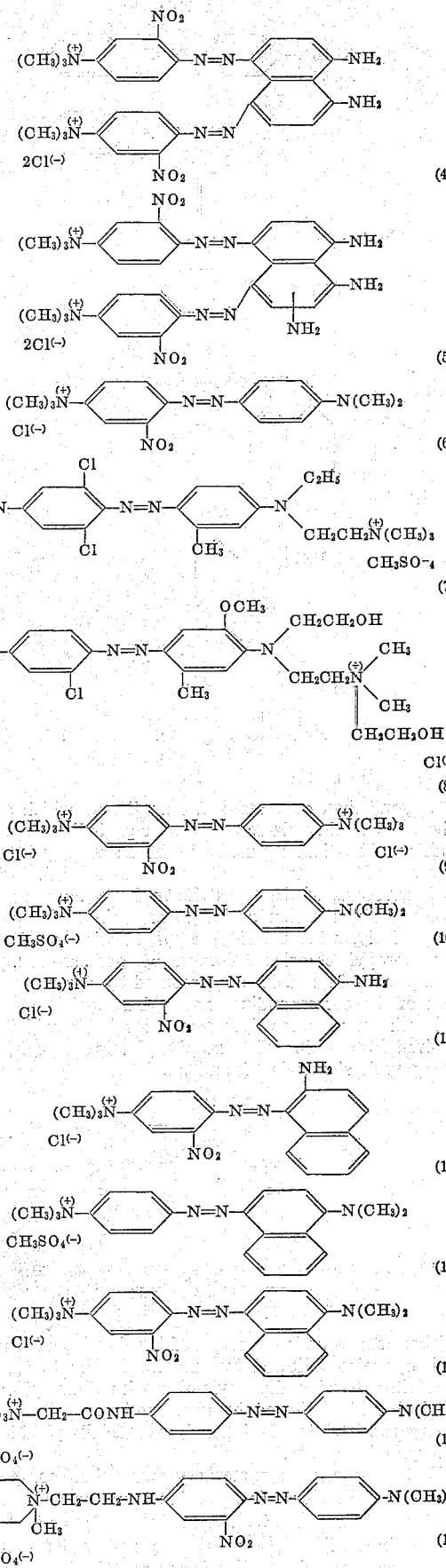

(17)

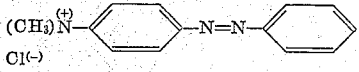
(18)

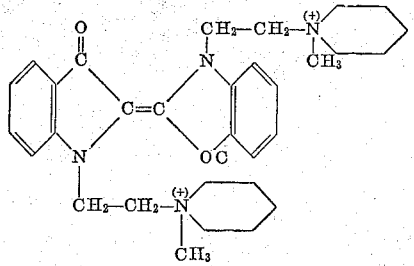
(19)

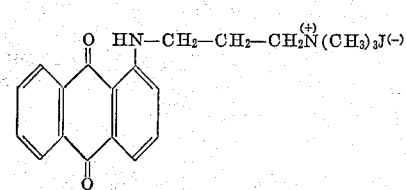
(20)

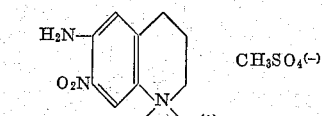
(21)

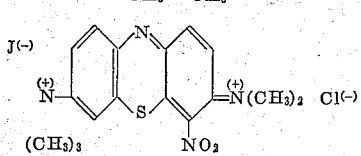
(22)

Beyond that, compounds are applicable which are derived from other classes of dyes, e.g., indigo or anthraquinone. Particularly useful in those classes are the dyes shown in Formulas 19 to 22, listed in column 3.

Compounds of the types shown in 19 and 20 can be produced by reaction of indigo or aminoanthraquinone, respectively, with piperidyl ethyl chloride or dimethyl aminopropyl chloride followed by quaternation. The Compounds 21 and 22 are prepared by direct quaternation of the corresponding tertiary bases.

Furthermore, nitro dyes also are suitable which have derived from dinitro diamino phenylamine, especially the compounds shown in 23 and 24.

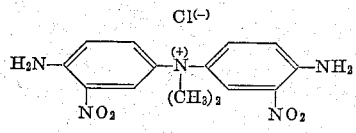
(23)

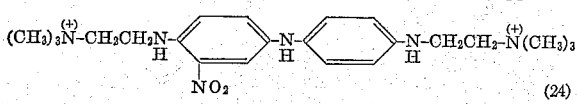
(24)

These compounds are prepared by nitration of diamino diphenylamine followed by quaternation or by reaction of dinitro diamino diphenylamine with dimethyl amino ethyl chloride followed by quaternation.

Agents containing the latter dyes especially yield brown and goldblond hues.

Furthermore, such quaternary ammonium compounds are usable which contain an amino group on an aromatic radical (which may be alkyl-substituted) and also in ortho-position thereto a nitro group and in para-position a quaternary radical. The latter may be bound to an aromatic radical by way of a group NH—CO—(CH$_2$)$_n$ or NH—CH$_2$—(CH$_2$)$_n$ ($n$=1–20).

Aromatic radicals to be considered for employment in the compounds include especially the 3-nitro-4-aminophenyl radical, the 3-nitro-6-methyl-4-aminophenyl radical and the 3-nitro-6-ethyl-4-aminophenyl radical. However, compounds also can be used which contain as aromatic radical a 3-nitro-4-aminonaphthyl group or a 3-nitro-4-aminoanthraquinonylic group. Particularly advantageous have been found such agents which contain quaternary ammonium compounds of the general formulations as shown in 25 to 27, wherein X denotes the quaternary ammonium radical. The compounds can be used singly or in mixtures.

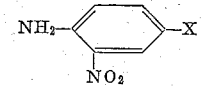
(25)

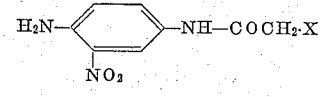
(26)

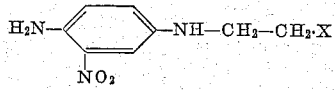
(27)

The quaternary ammonium compounds can be present in form of their corresponding salts, e.g., as chlorides, bromides, iodides, or as metho- and ethosulfates. It has been found that such compounds are especially effective which contain on the quaternary nitrogen atom a plurality of short-chain alkyl groups, e.g., methyl, ethyl or propyl groups. It is, however, no requirement that only like alkyl radicals be attached to the quaternary nitrogen atom. If different groups are attached to the nitrogen atom, it has been found opportune to have between two short-chain alkyl radicals one oxalkyl group. However, aliphatic-aromatic groups as, for instance, a benzyl group, also can be used as an additional radical on the quaternary nitrogen atom. If desired, such quaternary ammonium compounds can be employed in which two alkyl radicals are combined to a ring structure by way of further carbon atoms or of heteroatoms. Groupings are applicable in particular which lead to derivatives of pyrrolidine, piperidine, morpholine, tetrahydroquinoline of a configuration

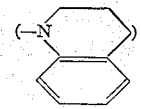

Finally, quaternary ammonium compounds of the type shown in 28 are applicable. In that formula, R$_1$ and R$_2$ may represent like or different alkyl radicals having preferably from 1 to 5 carbon atoms; X is any organic radical, preferably (CH$_2$)$_n$ ($n$=1–20). In lieu of the benzene radical, the 3-nitro-4-aminoanthraquinonyl radical or the 3-nitro-4-aminonaphthyl radical can be substituted in this case, also.

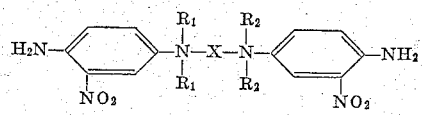
(28)

The above-named compounds can be prepared by way of their corresponding tertiary amines by quaternation. For instance, for the production of 3-nitro-4-aminophenyl trimethyl ammonium chloride, the starting product is dimethyl aniline which, in a first step, is converted to 4-nitroso dimethyl aniline. The next step consists in the conversion of the nitroso group into an amino group by means of suitable reducing agents. The amino group thus obtained then is acetylated. This reaction product is nitrated, the acetyl group is split off for conversion into 2-nitro-4-dialkylamino aniline, and the latter reacted with 1 mol methyl chloride into the monoquaternary compound.

This method is rather complicated especially when compounds are to be prepared which contain different hydrocarbon radicals in the quaternary ammonium group. It has been found, however, that such compounds can be made much more easily by quaternating 2-nitrophenylene diamine-1,4 with alkyl compounds known as quaternating agents, converting the monoquaternary compound thus obtained by a treatment with superheated steam into 2-nitro-4-dialkylamino aniline and introducing into the latter by a second quaternation a hydrocarbon radical which differs from the ones already present.

Suitable quaternating agents for the first step of this new process are especially alkyl halogenides, e.g., methyl chloride, ethyl chloride, methyl iodide, ethyl iodide, and dimethyl sulfate.

The quaternation is carried out in a known manner, for instance, as described in the "Encyclopedia of Chemical Technology" (Kirk-Othmer, vol. 11, 1953, p. 379). The process can be carried out in the presence of solvents or without them and with or without pressure. If solvents are employed, the reaction is carried out at temperatures of 30 to 150° C. whereby the maximum temperature usually is determined by the boiling point of the solvent. As solvents, organic substances such as benzene, chlorobenzene, toluene, xylene, butyl acetate, carbon tetrachloride and alcohol may be used. It often is of distinct advantage to work in the presence of alkaline substances, such as KOH, NaOH, $K_2CO_3$, $Na_2CO_3$, $NaHCO_3$ or $CH_3COONa$. If so desired, the quaternation also may be carried out in the presence of an alkali in aqueous suspension.

When the reaction is carried out without the aid of solvents, as often is expedient in the conversion of tertiary bases into the quaternary salt, temperatures of approximately 100 to 125° C. should be applied. The quaternating agent is used in such amounts as are required stoichiometrically for the conversion of the primary amine into the quaternary base. Employment of an excess is not necessary although in some cases it may be helpful.

For the conversion of tertiary bases into the quaternary salt, lesser quantities, of course, are required.

After conversion of the 2-nitrophenylene diamine-1,4 to the corresponding monoquaternary ammonium compound, the latter is freed from solvent and treated with superheated steam, preferably at temperatures of 150–350° C. The separation of the monoquaternary compound is easy as it usually precipitates on quaternation. The reaction with superheated steam again can be carried out in a solvent.

However, it often is advantageous to permit the superheated steam to act on the solid substance. In this case, the reaction proceeds according to Formula 29 wherein R denotes a lower alkyl radical and X a halogenide.

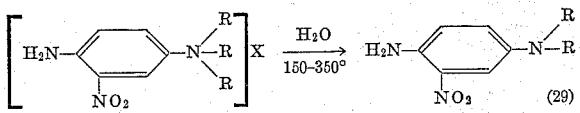

In this mode of operation, the monoquaternary ammonium salt practically is decomposed simultaneously, and the split products are distilled with steam. After condensation of the steam, the salt of the tertiary base present in the distillate is converted into the free base by addition of alkali. The base can be recovered by known methods, e.g., by extraction with organic solvents, such as ether, followed by the evaporation of the solvent.

The 2-nitro-4-dialkylamino aniline is quaternated. It had been stated above that this conversion of the tertiary bases to quaternary compounds can well be carried out in a solvent-free process. However, an agent is to be used for quaternation whose hydrocarbon radical differs from those already present. This may be an aliphatic, aliphatic-aromatic or cycloaliphatic radical which, moreover, contains one or more functional groups, such as hydroxyl, carboxyl, sulfo, nitro or also ether groups. The aliphatic radical of these compounds may be of any length and may even be branched. Hence, suitable quaternating agents, for instance, are ethylene chlorohydrin, chloroacetic acid, chloroacetic acid esters of methyl, ethyl and also higher primary alcohols, benzyl chloride, substituted benzyl chloride, e.g., nitrobenzyl chloride, alkyl benzyl chloride, particularly with a long alkyl radical and, if such a radical is not already present, methyl iodide, or dimethyl sulfate. This does not preclude the application of compounds of different structure such as, e.g., tetrahydrofurfuryl halogenides or compounds of the formula $R(OCH_2—CH_2)_nX$ wherein R denotes an aliphatic, aliphatic-aromatic or a cycloaliphatic radical, X denotes a halogen and $n$ a whole number between 1 and 20. In this manner, monoquaternary compounds of 1-nitrophenylene diamine-1,4 are obtained in good yield which are comparatively difficult to prepare by other means since, as stated above, even the production of 2-nitro-4-dialkylamino aniline is difficult to accomplish in a technologically simple manner.

The novel agents can be applied as solutions or else in paste or cream form. In the latter case, they are mixed with nonionic wetting agents. Compounds containing addition products of ethylene oxide or propylene oxide on active hydrogen, especially fatty alcohols, fatty acids, alkylphenols, alkyl- or alkylaryl amines may be used.

Furthermore, it often is advantageous to admix thickening agents, e.g., methyl cellulose, starch or other compounds used for the purpose, such as higher fatty alcohols, petrolatum or fatty acids. These additives are employed in the customary amounts.

Moreover, the dyes according to the present invention can be applied in conjunction with so-called ampholitic soaps, i.e., alkali salts of alkylaminopropionic acid or of alkylaminoacetic acid having 8 to 20 carbon atoms in the alkyl radical. Ampholytic compounds are amphoteric electrolytes.

In some instances it has been found that the applicability of the dyes is enhanced by addition of higher fatty acid salts. Particularly suited are the sodium, potassium, ammonium and ethanolamine salts of such fatty acids as palmitic, stearic, lauric and oleic acids or mixtures thereof.

The dyes named, as stated above, have superior water-solubility and also have the property of not or not substantially dyeing the skin. They impart a natural color to the hair, but it is possible to dye the hair in a stylish fashion. Moreover, the dyes can be applied singly or in any desired mixture depending upon the desired end effect.

The invention now will be further explained by the following examples. However, it should be understood that these are given merely by way of illustration, not of limitation, and that numerous changes may be made in the details without departing from the spirit and the scope of the present invention as hereinafter claimed.

EXAMPLE 1

A dye is prepared by reacting diazotized 3-nitro-4-aminophenyl trimethyl ammonium chloride with aniline. Five parts of the dye are dissolved in 1,000 parts of water, and the pH adjusted to 9 by addition of ammonia. The solution thus obtained colors gray hair goldblond within 20–30 minutes at a temperature of approximately 35° C.

EXAMPLE 2

A dye of the formula shown as 30 is prepared by reaction of 1,4-diaminoanthraquinone with piperidine ethyl chloride followed by quaternation with methyl iodine. 0.17 part of the dye thus obtained is dissolved, together with 0.17 part 3-nitro-4-aminophenyl aminoethyl trimethyl ammonium iodine, 0.17 part of 3-nitro-4-aminophenyltrimethylammoniumchloride and 2 parts methyl cellulose, in 97.5 parts water. The pH is adjusted to 9 by addition of ammonia. The solution thus obtained is highly viscous and dyes gray hair approximately black within 20–30 minutes at 35° C.

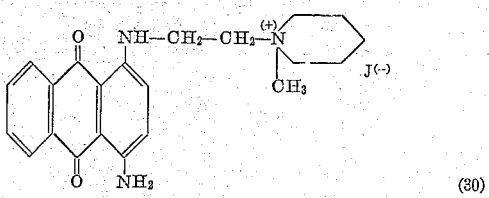

(30)

EXAMPLE 3

A dye is prepared having the formula shown in 31 by reaction of 3,3'-dinitro-4,4'-diaminodiphenyl amine with dimethyl sulfate in an organic solvent. 10 parts of this dye, together with 30 parts fatty acid ethanolamide and 120 parts of an ethoxylation product of a higher fatty alcohol, are dissolved in 860 parts water. The solution is adjusted to a pH of 9 with ammonia. Gray hair attains a neutral brown color when treated with such a solution for 20–30 minutes at body temperature.

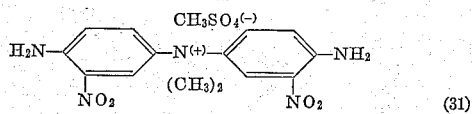

(31)

EXAMPLE 4

A dye is prepared having the formula as shown in 31 by reaction of 4,4'-diaminodiphenyl amine with dimethyl aminoethyl chloride, followed by nitration and quaternation with methyl iodide. 5 parts of the dye thus obtained are dissolved in 1,000 parts water, and the pH of the solution adjusted to 9 with ammonia. This solution colors gray hair gold blond.

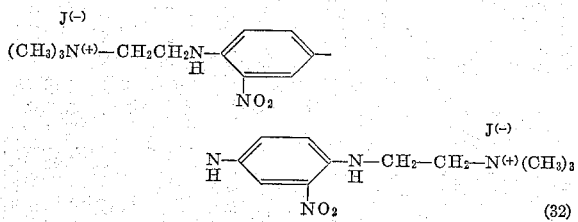

(32)

A transparent and highly viscous hair coloring paste is obtained if, instead of the above-named procedure, 10 parts of the dye, 150 parts paraffin oil, 50 parts petrolatum, 50 parts oleic acid oleyl ester and 300 parts of an ethylene oxide addition product (approximately 10 mols) on higher fatty alcohols are mixed with 440 parts water. The pH of the mixture is adjusted to 9 with ammonia.

Gray hair treated with this preparation for approximately 30 minutes at 35° C. is dyed gold blond.

EXAMPLE 5

A dyestuff is prepared by reaction of diazotized 3-nitro-4-aminophenyl trimethyl ammonium chloride with phenylene diamine-1,3. 10 parts of the dye are dissolved in 190 parts water and are stirred at 50° C. into an emulsion consisting of 150 parts of a fatty alcohol mixture ($C_{16}$–$C_{18}$ alcohols), 150 parts of an ethoxylated fatty alcohol and 300 parts water. The pH is adjusted to 9 with ammonia. The cream thus obtained dyes gray hair red brown within 20 to 30 minutes at 35° C.

In Table 1, further examples are given for dyes with which, by procedures analogous to the one given in Example 5, gray hair can be dyed to the colors indicated. The colors obtained are of good light stability.

EXAMPLE 6

(a) A mixture of 61.2 g. 2-nitrophenylene diamine-1,4 with 6 g. $NaHCO_3$ and 400 g. benzene is prepared at 40° C. To this mixture are added slowly 151 g. dimethyl sulfate and an additional 33.6 g. $NaHCO_3$. The temperature then is raised to 75°, and the mixture is kept at this temperature, i.e., boiling under reflux, for 3 hours with mechanical agitation.

The precipitate forming in the reaction is separated from the solvent, boiled with 400 g. acetone and dissolved in approximately 1,000 g. water. After heating at 80° C. for a short time and neutralization with dilute NaOH, the solution is filtered, and the bright yellow 3-nitro-4-aminophenyl trimethyl ammonium chloride is precipitated by addition of 300 g. NaCl. The precipitate is filtered by suction and dried. The yield is approximately 80 percent.

*Table 1*

| No. | Dyestuff | Color |
|---|---|---|
| (33) | $(CH_3)_3\overset{(+)}{N}$—⟨⟩—N=N—⟨⟩—$N(CH_3)_2$, $Cl^{(-)}$, $NO_2$ | Deep red. |
| (34) | $(CH_3)_3\overset{(+)}{N}$—⟨⟩—N=N—⟨⟩—$\overset{(+)}{N}(CH_3)_3$, $Cl^{(-)}$, $Cl^{(-)}$, $NO_2$ | Gold blond. |
| (35) | $(CH_3)_3\overset{(+)}{N}$—⟨⟩—N=N—⟨⟩—$N(CH_3)_2$, $Cl^{(-)}$ | Orange red. |
| (36) | $(CH_3)_3\overset{(+)}{N}$—⟨⟩—N=N—⟨naphthyl⟩—$NH_2$, $Cl^{(-)}$, $NO_2$ | Red purple. |
| (37) | $(CH_3)_3\overset{(+)}{N}$—⟨⟩—N=N—⟨naphthyl-$NH_2$⟩, $Cl^{(-)}$, $NO_2$ | Red brown. |

Table I—Continued
| No. | Dyestuff | Color |
|---|---|---|
| (38) | 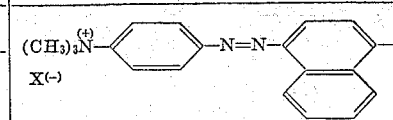 | Orange. |
| (39) | 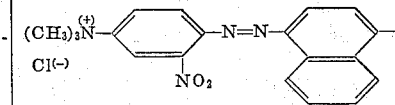 | Red purple. |
| (40) | 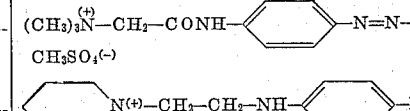 | Greenish yellow. |
| (41) | 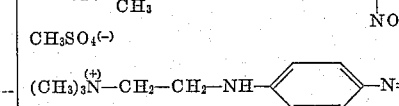 | Yellow. |
| (42) | 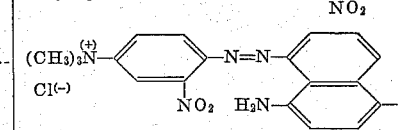 | Gold blond. |
| (43) | 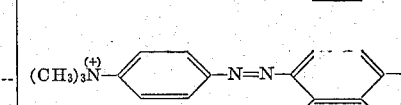 | Brown. |
| (44) | 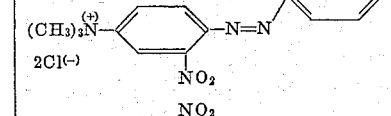 | Do. |
| (45) | 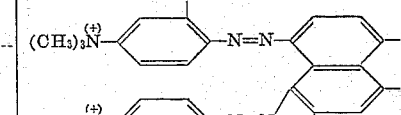 | Brown black. |
| (46) | 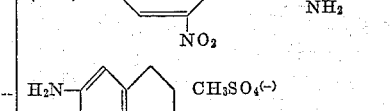 | Yellow. |
| (47) | 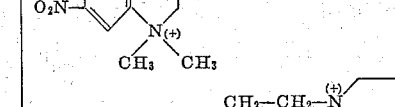 | Blue green. |
| (48) | 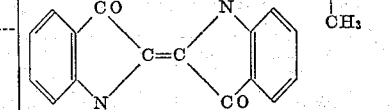 | Blue. |
| (49) | 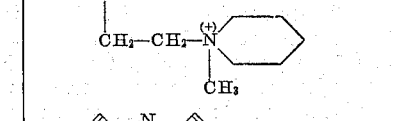 | Claret. |

Table I—Continued

| No. | Dyestuff | Color |
|---|---|---|
| (50) | O₂N—[Cl,Cl-C₆H₃]—N=N—[C₆H₃(CH₃)]—N(C₂H₅)(CH₂CH₂N⁺(CH₃)₃) · CH₃SO₄⁻ | Orange brown. |
| (51) | O₂N—[Cl-C₆H₃]—N=N—[C₆H₂(OCH₃)(CH₃)]—N(CH₂CH₂OH)(CH₂CH₂N⁺(CH₃)₂CH₂CH₂OH) · Cl⁻ | Red brown. |
| (52) | (CH₃)₃N⁺—[C₆H₃(NO₂)]—N=N—[C₁₀H₅(NH₂)(H₂N—)]  Cl⁻ | Brown. |
| (53) | (CH₃)₃N⁺—[C₆H₃(NO₂)]—N=N—[C₁₀H₄(NH₂)(H₂N—)(NH₂)]  Cl⁻ | Black. |
| (54) | (CH₃)₃N⁺—[C₆H₃(NO₂)]—N=N—[C₁₀H₄(NH₂)(H₂N—)(NH)]  Cl⁻ | Do. |

10 g. of the quaternary ammonium salt thus obtained are treated with steam at approximately 300° C. for 10 minutes whereby decomposition and simultaneous distillation occur. From the distillate, 2-nitro-4 dimethylamino anilin is recovered by addition of 1 g. NaOH and extraction with ether.

(b) 1.81 g. (0.01 mol) of the 2-nitro-4-dimethylamino aniline obtained as described under (a) are refluxed with 8 g. (0.10 mol) ethylene chlorohydrin for 90 minutes. After vacuum distillation of the excess ethylene chlorohydrin, 2.5 g. of a monoquaternary ammonium salt of the formula as shown in 55 remain.

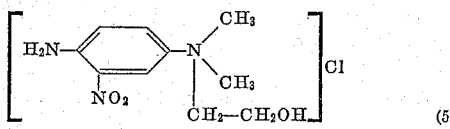     (55)

(c) One part of the monoquaternary ammonium salt obtained as described in (b), 6 parts of an anionic capillary-active substance (condensation product of a fatty alcohol and ethylene oxide), and 6 parts of a 30% solution of the triethanolamine salt of the acid sulfuric acid ester of coconut fatty alcohol are dissolved under addition of 87 parts water. The pH value is adjusted to 9 with ammonia or triethanolamine. Gray hair treated at 35° C. with that solution for 15–30 minutes attains a medium brown tint.

EXAMPLE 7

18.1 parts 2-nitro-4-dimethylamino aniline, prepared in accordance with Example 6 (a), are dissolved in 200 parts methanol and refluxed with 12.8 parts benzyl chloride. After separation of the solvent, 23 g. of yellowish green crystals are obtained which are a quaternary compound as shown in Formula 56 having a melting point of 164° C. (with decomposition).

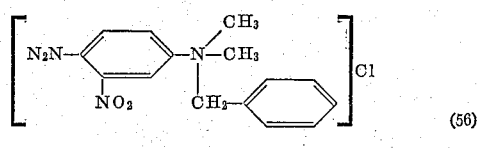     (56)

When a 0.5% aqueous solution of 3-nitro-4-aminophenyl benzyl dimethyl ammonium chloride, adjusted to pH of 9 with ammonia, is allowed to act on gray hair for 15–30 minutes at 35° C., it attains a yellow coloring.

EXAMPLE 8

Gray hair, treated with a 0.1% aqueous solution of a compound as shown in 57 at 30–35° C., exhibits after approximately 20–25 minutes a gold blond color with a reddish sheen.

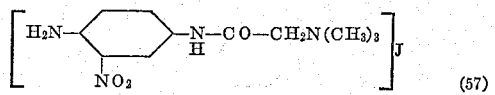     (57)

EXAMPLE 9

0.5 g. 3 - nitro - 4 - aminophenyl trimethyl ammonium chloride are dissolved in 100 g. water together with 5 g. alkyl trimethyl ammonium chloride whose alkyl radicals contain 16 to 18 carbon atoms. A pH value of 9 is obtained by adjustment with ammonia. The solution thus obtained colors gray hair within approximately 20 minutes at approximately 35° C. bright yellow.

EXAMPLE 10

0.125 part 3-nitro-4-aminophenyl trimethyl ammonium chloride, 0.05 part 3-nitro - 4 - aminophenyl aminoethyl trimethyl ammonium chloride and 10 parts of an anionic capillary-active reaction product of a fatty alcohol with ethylene oxide are dissolved in 90 parts water. The solution thus obtained is adjusted to a pH of 9 with ammonia. If applied according to the conditions of Example 3, gray hair will be colored an umber brown.

EXAMPLE 11

A jellied hair coloring agent is obtained by first dissolving the following:

| | |
|---|---:|
| Anionic capillary-active fatty alcohol-ethylene oxide addition product | 30 |
| Paraffin oil | 15 |
| Petrolatum | 5 |
| Fatty alcohol (C₁₆–C₁₈) | 5 |

Into the above, a mixture is entered at 80° C. consisting of 0.2 part 3-nitro-4-aminophenyl aminoethyl ammonium chloride, 0.3 part 3-nitro-4-aminophenyl trimethyl ammonium chloride and 45 parts water. This mixture is allowed to cool under agitation to 20°. The jelly thus obtained, applied to gray hair and allowed to act for 15–30 minutes, colors the hair light brown.

EXAMPLE 12

1 part of the dyestuff according to Example 6(c), 10 parts sodium dodecyl aminopropionate and 89 parts water are agitated and heated to 70° C. After allowing to cool, a solution is obtained which within approximately 25 minutes at 35° C. colors gray haird light blond.

EXAMPLE 13

0.4 part 3-nitro-4-aminophenyl trimethyl ammonium chloride, 0.1 part 3-nitro-4-aminophenyl aminoethyl trimethyl ammonium chloride, 5 parts potassium stearate and 25 parts of a water-soluble ethoxylation product of higher fatty alcohols are brought to 100 parts by addition of the required amount of water. The pH is adjusted to 9 by addition of ammonia. The solution obtained is highly viscous and colors gray hair umber brown within 20 to 30 minutes at 35° C.

EXAMPLE 14

0.4 g. N-methyl-N(3-nitro-4-aminophenyl) morpholinium methosulfate and 0.1 g. 3-nitro-4-aminophenyl aminoethyl methylpiperidinium iodide are dissolved in 27 g. water and are stirred at 75° C. into an emulsion consisting of 20 g. of an ethoxylated fatty alcohol mixture ($C_{16}$–$C_{18}$ alcohols), 3 g. of the same alcohol mixture not ethoxylated and 50 g. 5% potassium stearate. The pH is adjusted to 9 with triethanol amine. The cream obtained colors gray hair brown within 20–30 minutes at approximately 35° C.

We claim as our invention:

A process for the dyeing of human hair, which comprises applying to said hair for approximately 15 to 30 minutes at a temperature of substantially 35° C. an aqueous solution of water-soluble dyestuffs containing quaternary ammonium groups, being free from acidic groups and having a cation which imparts dyestuff characteristics; said quaternary ammonium groups containing a homocyclic aromatic radical, an amino group thereon, in ortho-position to said amino group a nitro group, and in para-position to said amino group the quaternary radical which is bound to said aromatic radical by a member selected from the group consisting of —NH—CO$(CH_2)_n$ and —NH—$CH_2(CH_2)_n$, wherein $n$ denotes a whole number ranging from 1 to 20; said dyestuffs being selected from the group consisting of monoazo dyes, thiazine dyes, and dyes derived from nitrophenylene diamine.

References Cited in the file of this patent
UNITED STATES PATENTS

| | | |
|---|---|---|
| 602,639 | Konig | Apr. 19, 1898 |
| 1,887,995 | Conzetti | Nov. 15, 1932 |
| 2,083,182 | Zweifel et al. | June 8, 1937 |
| 2,498,875 | Bock | Feb. 28, 1950 |
| 2,501,184 | Michaels et al. | Mar. 21, 1950 |
| 2,532,588 | Woodward | Dec. 5, 1950 |
| 2,775,972 | Blair | Jan. 1, 1957 |
| 2,848,369 | Seemuller | Aug. 19, 1958 |
| 2,913,303 | Baumann et al. | Nov. 17, 1959 |

FOREIGN PATENTS

| | | |
|---|---|---|
| 1,159,331 | France | Feb. 10, 1958 |

OTHER REFERENCES

Sagarin: Cosmetics, Science and Technology, Interscience Publ., New York (1957), p. 589.

Venkataraman: Chemistry of Synthetic Dyes, vol. I, Academic Press, Inc., New York (1952), pp. 520–522.

Schwarz et al.: Surface Active Agents and Detergents, vol. 2, p. 625.

Freese et al.: Am. Perf. and Aromatics, 67:3, March 1956, pp. 37–40.